April 29, 1969 E. F. DALY ET AL 3,441,349
OPTICAL APPARATUS FOR MEASURING THE LIGHT
TRANSMISSION OF A SAMPLE BODY
Filed June 30, 1964 Sheet 1 of 2
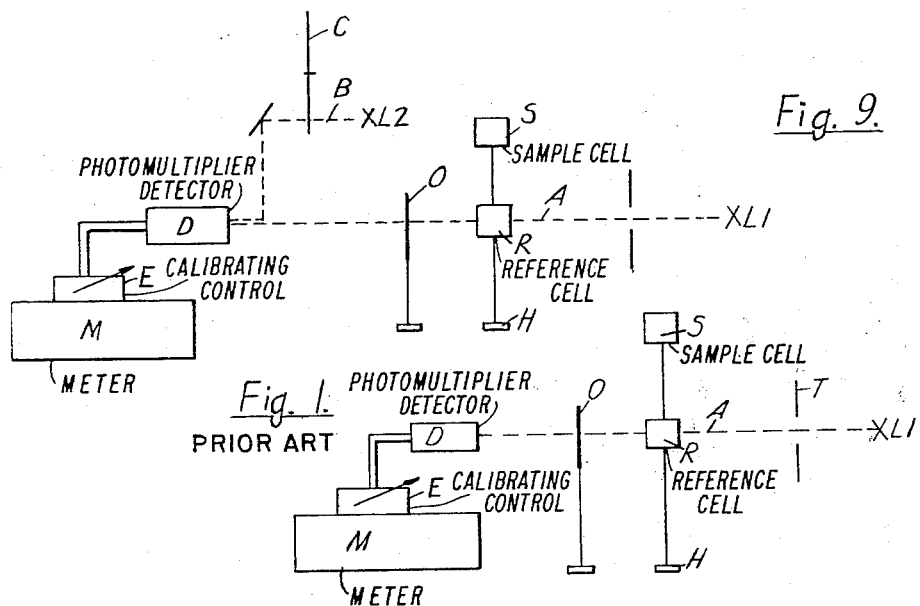
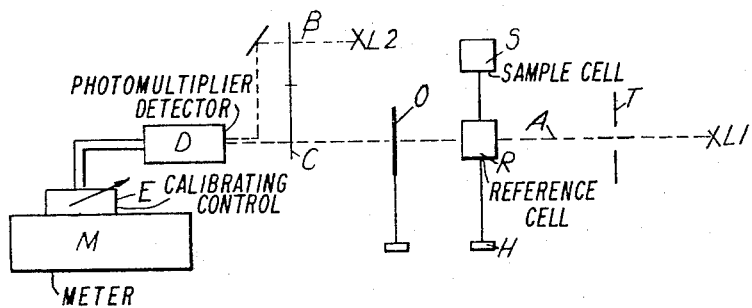
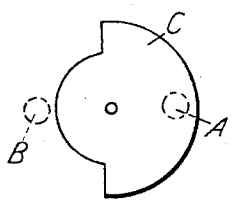
Inventor
EDGAR FRANK DALY
DEREK DAVID SHREWSBURY
By
Mead, Browne Schuyler & Beveridge
Attorney United States Patent Office 3,441,349
Patented Apr. 29, 1969

3,441,349
OPTICAL APPARATUS FOR MEASURING THE LIGHT TRANSMISSION OF A SAMPLE BODY
Edgar Frank Daly and Derek David Shrewsbury, Cambridge, England, assignors to Pye Limited, Cambridge, England
Filed June 30, 1964, Ser. No. 379,193
Claims priority, application Great Britain, July 4, 1963, 26,471/63
Int. Cl. G01j 3/42, 3/46
U.S. Cl. 356—93                    4 Claims

ABSTRACT OF THE DISCLOSURE

Apparatus and method for measuring the relative intensities of light transmission through a sample body and a reference body, e.g. in a spectrophotometer, comprises a light sensitive detector, a light source providing a first beam of light onto the detector, means for alternatively positioning the sample body and the reference body in said first beam and means providing a second beam of light onto said detector. At least one of the two beams is chopped so as to provide an alternating electrical output at the detector. The intensity of one of the beams of light is adjusted so that, when the reference body is in the first beam, the two beams may be brought to equality. The sample body is then positioned in the first beam and the amplitudes of the two alternating components of the detector output are then used to indicate the ratio of the amplitude of the first beam to that of the second beam and hence the ratio of the light transmission of the sample body compared with the reference body.

---

Figure 4:
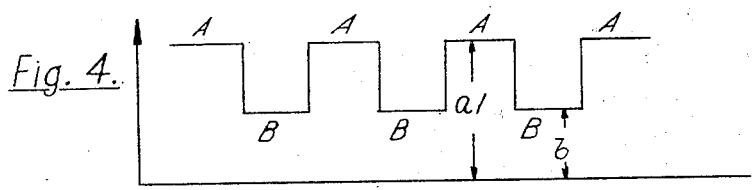

This invention relates to optical measuring or indicating instruments in which the respective intensities of beams of light are to be compared. In particular the invention relates to spectrophotometers but may have wider application. The light may be ultraviolet, visible light or infrared radiation.

Instruments of this type fall into two classes (a) the single beam and (b) the double beam instrument In the double beam instrument two beams of light are simultaneously or alternately passed respectively through a sample body and through a reference body. Such instrument has advantages and disadvantages as compared with the normal single beam instrument, one disadvantage being that the double beam instrument has lower attainable accuracy of transmission measurement due to variation in beam cross-section and position when selecting the particular wave length of the light at which the measurement is being made. In a single beam instrument a light beam is adapted to be passed through a reference body to a detector. The output from the detector is arranged to give an indication on a scale or meter proportional to the intensity of the light beam reaching the detector. This indication is usually adjusted to read full-scale of 100%. The reference body is now replaced by the sample and the scale reading is taken, the scale being calibrated if desired to indicate percentage transmission or absorbance. When using a detector such as a photomultiplier tube, the time taken between the respective beam readings before the tube settles down and can be used again to give accurate information, is often too great to be convenient and of course it is necessary that the operating conditions in the tube should be the same when taking the readings for the reference body and/or sample.

According to one feature the invention is an optical measuring or indicating instrument e.g. a spectrophotometer, comprising a detector adapted to receive two light beams, the intensity of the first of which depends in turn upon the light transference of a sample and of a reference body according to which rests in the first light beam and which are adapted to be placed in the beam in replacement of one another, the other beam being from the same or a similar or other source and being independent of the said light transference, means for periodically interrupting the access of at least one beam to the detector, and means provided in the detector circuit for indicating the ratio of the intensity of the two beams incident upon the detector.

Means are preferably provided for making adjustment of the relative intensities of the beams at some appropriate point before the detector. For example one of the beams may be passed through an adjustable aperture. A removable shutter for shielding the detector from either beam may be used for calibration purposes.

The light source for the reference body or sample may comprise a monochromator, or its equivalent e.g. filter or other means of selecting the wave length or colour of radiation required for the measurement. Alternatively the monochromator or its equivalent may occupy any appropriate position in this beam before it reaches the detector.

In one arrangement according to the invention a first source of monochromatic light is caused to produce a beam into which a sample to be tested may be introduced in replacement of a reference body or vice versa, the first beam being thereupon passed to a detector, a second beam being derived from a constant light source and being also fed to the detector, and the chopper being inserted in the path of the two beams so that first one and then the other beam is fed to the detector. The detector may be of any appropriate type as will be explained hereinafter. However one advantage of the invention is to overcome a defect as aforesaid in a photomultiplier tube.

Accordingly, a still further feature of the invention is a spectrophotometer in which a light beam subject to intensity variations by the respective light transference of a sample and reference body is fed to a photomultiplier tube to which is also fed a beam of constant intensity, means being provided for interrupting at least one of the beams before it reaches the photomultiplier tube and means for deriving from the latter a series of electrical pulses whose frequency depends only upon the form and speed of movement (e.g. rotation) of the chopper and of which pulses a characteristic represents a ratio of intensity between the two beams at the detector.

Where it is desired, the said ratio may be arranged to be unity, by adjusting a variable aperture or filter in one or both the light beams.

The above and other features of the invention will be more readily understood by a perusal of the following description, having reference to the accompanying drawings in which: FIGURE 1 is a diagram of a known form of spectrophotometer; FIGURE 2 is a diagram of a spectrophotometer according to one embodiment of the present invention; FIGURE 3 shows a detail of FIGURE 2 and FIGURES 4 to 8 are curves used to illustrate how the invention may be used.

FIGURE 9 is a diagram of a spectrophotometer according to another embodiment of the invention.

In FIGURE 1 L1 is a source of monochromatic radiation which may comprise a monochromator or filter, producing a beam of light A which traverses a variable aperture T. In the diagram the light beam is shown traversing a reference body R. By operating a control H the body R may be replaced in the beam by a sample S under test. The light beam from R or S pass to a detector D whose output is taken to a meter or indicator M. The detector may be a photomultiplier tube. The sample and reference body may be contained in a solvent in identical cuvettes. When calibrating, a shutter O is closed to shield the detector D from radiation and the reading on meter or indicator would be adjusted to zero, as by a calibrating control E, indicating no light input.

It will be apparent that the accuracy of the measuring or indicating system, that is, of D and M, depends on their having identical sensivity and response to a given amount of radiation for the readings for both the reference and sample bodies. Some detectors e.g. certain photomultipliers exhibit continuous changes in sensivity to radiation over quite long periods of time after a change of incident radiation intensity, or after a change of operating conditions, such as a change of applied voltage.

In FIGURE 2 we have shown one embodiment of the invention. Like parts in FIGURES 1 and 2 bear like reference characters. As shown we have introduced a second beam B from a source L2 of constant intensity. The beam B is arranged to pass to the detector D and in the path of the beams A and B is a chopper C shown also in FIGURE 3, which interrupts the beams alternately so that the detector receives radiation from only one beam at a time. In this way the detector output takes the form of a series of subsantially square electrical pulses which occur at a frequency dependent only upon the form and speed and rotation of the chopper C. The meter M is arranged to provide an output representing the ratio of the intensity of the two beams incident upon the detector. When the reference body is in the beam A, the aperture T may be used to vary the intensity of beam A to give a unity indication of said ratio in the meter. With the sample substituted in beam A the meter M will indicate the ratio of relative intensities of the respective beams A and B as presented to the detector. It will be seen that in the first case the detector is merely to detect equality between two radiation beams fed to it alternately and in the second case the detector is required to determine continuously the ratio of the two beams presented to it alternately. Since this ratio is being continuously re-measured at the frequency of the chopper, C, relatively slow changes in detector sensitivity will have a negligible effect on the accuracy of the measurement providing that this frequency is sufficiently high.

In the above description it is assumed that for the range of light intensities to which the detector is subjected, there is a linear relationship at any instant between the magnitude of the signal output and the intensity of the light incident upon the detector.

FIGURE 4 is a graph representing a voltage which may be derived from the signal output of the detector when the intensity of radiation received by the detector from beam A is greater than that received by the deector from beam B. In the figure the strength of the voltage signal at a time when beam A is falling onto the detector is marked as $a_1$. The voltage signal during the next half-period when beam B is falling onto the detector is marked as $b$. In this example, $a_1$ is greater than $b$.

The intensity of radiation in beam A may be varied by opening or closing the variable aperture, T.

Assume now that the reference medium, R, is in the beam A, and that adjustments are made to the variable aperture, T, until the voltage signal produced by the effect of beam A on the detector is equal to the voltage signal produced by the effect of beam B upon the detector.

Figure 5:
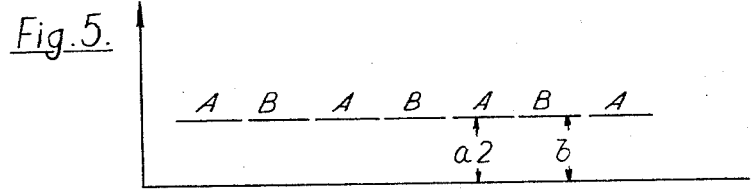

FIGURE 5 would then represent the voltage signal obtained in the same way as that of FIGURE 4. This signal has a smooth form with no component which varies at the frequency of the beam chopping. By the same nomenclature as used in FIGURE 4, the voltage signal strengths when the beams A and B are falling onto the detector are marked as $a_2$ and $b$ respectively. In this example, $a_2=b$.

Figure 6:
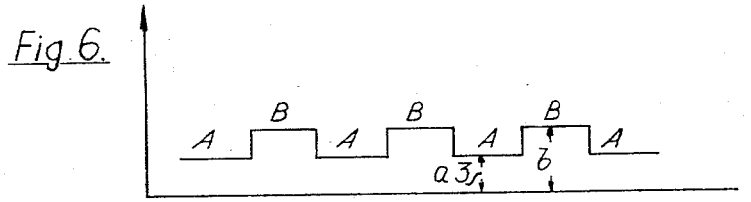
Figure 7:
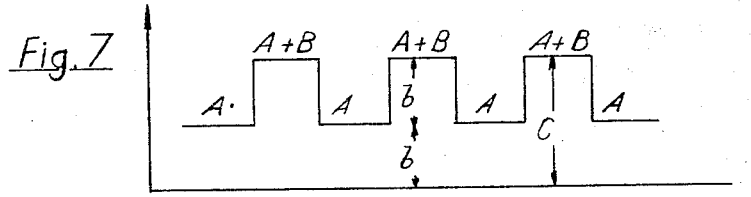
Figure 8:
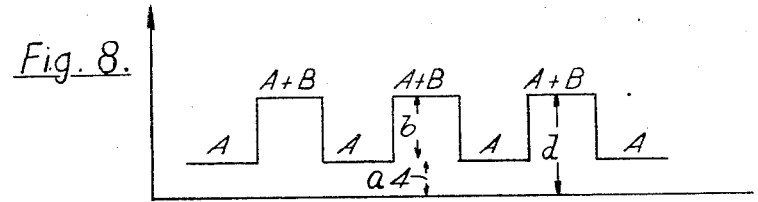

FIGURE 6 represents the voltage signal which would be obtained if now the cuvette containing an absorbing sample, S, is located into the beam A, instead of the reference medium, R, with no further adjustment to the position of the variable aperture, T.

Again by the same nomenclature as in FIGURES 4 and 5, the voltage signal strengths for beams A and B falling onto the detector are marked as $a_3$ and $b$ respectively.

If it is assumed that the signal voltage measured in the same manner as those of FIGURES 4, 5 and 6 is directly proportional to the amount of radiation falling onto the detector at the instant of measurement, then we can make the following deductions:

(1) $a_2$ represents the amount of radiation transmitted by the cuvette containing the reference medium, R.

(2) Since $a_2=b$, then $b$ represents the amount of radiation transmitted by the cuvette containing the reference medium, R.

(3) $a_3$ represents the amount of radiation transmitted by the cuvette containing the sample, S.

(4) The transmittance of the sample, S, (together with its cuvette) relative to the reference medium, R, (together with its cuvette) is given as the ratio $$a_3/a_2$$

which is the same as $a_3/b$ or, as a percentage $$100a_3/b$$

This ratio may be determined electrically or electromechanically by any of the known techniques (see for example an article entitled "A Photomultiplier Circuit for Precision Stectrophotometry" in American Journal, "Applied Optics," dated January 1964, volume 3, No. 1, pages 69–71).

Since in the first stage, the intensities of the second beam and the first beam—having passed through the reference body—have been brought to equality, the ratio determined in the second stage is a measure of the transmission of the sample relative to that of the reference body.

Various modifications may be made in the above apparatus to suit manufacturing or other convenience. For example, it may be convenient to place the beam chopper C into one of the two beams A or B only, leaving the other beam uninterrupted. The detector output would then be a substantially square wave of which the limits are $a$ and $a+b$ where $a$ is the voltage corresponding to one beam and $b$ the voltage corresponding to the chopped beam. By suitable electromechanical or electrical arrangements in M a null reading may be given when $a=2b$ and this condition could be obtained by adjustment of the variable aperture T.

Alternatively when the cuvette containing the sample S is put into beam A, the alternate voltage amplitudes in the output of D can be used to obtain the ratio of the beam intensities incident upon the detector.

Other modifications may be made without exceeding the scope of the invention. For example the variable aperture T may be situated in the beam B only, or in beams A and B, with the chopper acting on either or both of the beams.

We have used the term "chopper" to mean any appropriate means for cyclically interrupting a light beam.

We claim:

1. Optical apparatus for measuring the light transmission of a sample body compared with that of a reference body comprising a light sensitive detector, a light source providing a first beam of light onto said detector, means for alternatively positioning the sample body and the reference body in said first beam, means providing a second beam of light of constant intensity onto said detector, means for adjusting the intensity of one of said light beams so that the intensities of the beams at the detector may be brought to equality when the reference body is positioned in the first beam, a chopper periodically interrupting at least one of the light beams, a shutter operable to shield the detector from the first of said beams, calibrating means for setting the detector output to zero when the detector is shielded by said shutter from said first beam, and indicating means responsive to the ratio of the alternate output amplitudes of the detector at the chopper frequency to indicate the ratio of the amplitude for the first beam to that of the second beam when a sample body is positioned in the first beam.

2. Optical apparatus as claimed in claim 1, wherein said chopper is arranged to chop only the second beam.

3. Optical apparatus as claimed in claim 1, wherein said chopper is arranged to chop the two beams alternately.

4. Optical apparatus as claimed in claim 1, wherein said means providing a second beam of light onto said detector is a further light source independent of the light source providing said first beam.

References Cited
UNITED STATES PATENTS 2,561,243   7/1951   Sweet.
2,856,811   10/1958  Kaye _____ 250—220 X RONALD L. WIBERT, *Primary Examiner.*

F. L. EVANS, *Assistant Examiner.*

U.S. Cl. X.R.

250—220, 233; 356—179, 205